US012222307B2

(12) United States Patent
Moriizumi et al.

(10) Patent No.: US 12,222,307 B2
(45) Date of Patent: Feb. 11, 2025

(54) POLYMER MATERIAL, SENSOR ELEMENT, AND GAS MEASUREMENT DEVICE

(71) Applicant: TDK CORPORATION, Tokyo (JP)

(72) Inventors: Yukiko Moriizumi, Tokyo (JP); Raitaro Masaoka, Tokyo (JP)

(73) Assignee: TDK CORPORATION, Tokyo (JP)

( * ) Notice: Subject to any disclaimer, the term of this patent is extended or adjusted under 35 U.S.C. 154(b) by 351 days.

(21) Appl. No.: 17/957,051

(22) Filed: Sep. 30, 2022

(65) Prior Publication Data
US 2023/0243769 A1 Aug. 3, 2023

Related U.S. Application Data

(60) Provisional application No. 63/305,808, filed on Feb. 2, 2022.

(51) Int. Cl.
*G01N 27/12* (2006.01)
*G01N 29/02* (2006.01)
*G01N 27/22* (2006.01)

(52) U.S. Cl.
CPC ......... *G01N 27/126* (2013.01); *G01N 29/022* (2013.01); *G01N 2027/222* (2013.01); *G01N 2291/0257* (2013.01)

(58) Field of Classification Search
CPC ......... G01N 27/126; G01N 2291/0257; G01N 2291/014; G01N 2291/0215; G01N 2291/0256; G01N 29/2443; G01N 29/036
See application file for complete search history.

(56) References Cited

U.S. PATENT DOCUMENTS

| 6,177,523 | B1 * | 1/2001 | Reich | C08G 18/765 528/56 |
| 2007/0258866 | A1* | 11/2007 | Nishimi | B01J 20/3219 422/129 |
| 2008/0038841 | A1* | 2/2008 | Ezoe | G01N 33/54353 422/50 |
| 2020/0400629 | A1* | 12/2020 | Mulzer | C08G 61/12 |
| 2021/0239639 | A1* | 8/2021 | Kam | C01B 32/194 |

FOREIGN PATENT DOCUMENTS

EP 3 379 240 A1 9/2018
WO 2017/085796 A1 5/2017

* cited by examiner

Primary Examiner — Francis C Gray
(74) Attorney, Agent, or Firm — Oliff PLC

(57) ABSTRACT

A polymer material is contained in a sensing film of a sensor element having a quartz plate, an electrode made of a metal film provided on the quartz plate, and a sensing film provided on the electrode, and has a structural unit that contains one or more ethylene unsaturated bonds and is originated from a compound containing one or more functional groups reactive to a gas.

9 Claims, 3 Drawing Sheets

POLYMER MATERIAL, SENSOR ELEMENT, AND GAS MEASUREMENT DEVICE

CROSS-REFERENCES TO RELATED APPLICATIONS

This application relies for priority upon U.S. Provisional Application No. 63/305,808 filed on Feb. 2, 2022 the entire content of which is hereby incorporated herein by reference for all purposes as if fully set forth herein.

BACKGROUND

The present disclosure relates to a polymer material, a sensor element, and a gas measurement device including the sensor element.

In recent years, there has been an increasing need for measurement of volatile substances (smell) in fields such as environmental measurement, the medical field, and the food industry. In the related art, as a gas measurement device for measuring smells, there is a gas measurement device having a quartz oscillator and a conductive polymer film that adsorbs a gas to be detected. A gas measurement device including a quartz oscillator uses a quartz crystal microbalance (QCM) method, in which the mass of molecules is measured using oscillation of the quartz oscillator, and is highly sensitive.

Patent Document 1 describes a smell sensor including at least two sensor elements, each of which has a substance adsorption film containing a conductive polymer and a dopant and an electrical signal conversion unit that measures the electrical characteristics of the substance adsorption film. Moreover, Patent Document 1 describes that a quartz oscillator sensor (QCM) can be used as the sensor element. Furthermore, Patent Document 1 describes that the aforementioned sensor has a plurality of the sensor elements, and thus is enabled to adsorb substances having various characteristics by varying the configuration of the substance adsorption film provided on the surface of the sensor elements, for example, for every element.

Patent Document

[Patent Document 1] PCT International Publication No. WO 2017/085796

SUMMARY

In a gas measurement device that includes a sensor element having a quartz oscillator, the sensor element detects the gas concentration by utilizing the fact that the fundamental frequency of the quartz oscillator decreases when a gas is adsorbed onto a conductive polymer film and the mass increases. Accordingly, the sensor element cannot distinguish between whether only the gas to be detected has been adsorbed onto the conductive polymer film or a gas, which is not a detection object, has been adsorbed onto the conductive polymer film.

Therefore, in the prior art, a plurality of types of gases can be detected by using a gas measurement device including a plurality of types of sensor elements that have conductive polymer films having different gas adsorption characteristics.

However, gas measurement devices including a plurality of types of sensor elements have many types and numbers of sensor elements, and thus requires time and effort for manufacturing, and miniaturization thereof and power saving therein are difficult.

Therefore, it is required that a plurality of types of gases be able to be detected by one sensor element.

It is desirable to provide a polymer material which is incorporated in a sensing film of a sensor element, which has the sensing film formed on a quartz plate with an electrode therebetween, to obtain a sensor element capable of detecting a plurality of types of gases.

Moreover, it is desirable to provide: a sensor element which includes a sensing film containing the polymer material according to the present disclosure and with which a plurality of types of gases can be detected; and a gas measurement device including the sensor element.

Following means are provided.

[1] A polymer material contained in a sensing film of a sensor element having a quartz plate, an electrode made of a metal film provided on the quartz plate, and a sensing film provided on the electrode, in which the polymer material has a structural unit that contains one or more ethylene unsaturated bonds and is originated from a compound containing one or more functional groups reactive to a gas.

[2] The polymer material as described in [1], in which the functional groups are one or more selected from a carboxy group (—COOH), a carbonyl group (C=O), and an amide group (—CONH$_2$).

[3] The polymer material as described in [1] or [2], in which the polymer material contains a structural unit that contains one or more ethylene unsaturated bonds and is originated from a compound containing a carboxy group (—COOH) and a methyl group (—CH$_3$), and a structural unit that contains one or more ethylene unsaturated bonds and is originated from a compound containing a methyl group (—CH$_3$) and a carbonyl group (C=O).

[4] The polymer material as described in [1] or [2], the polymer material containing any one of (1) to (5) below:

(1) a structural unit that contains one or more ethylene unsaturated bonds and is originated from a compound containing a carboxy group (—COOH) and a methyl group (—CH$_3$), and a structural unit that contains one or more ethylene unsaturated bonds and is originated from a compound containing a phenylene group (—C$_6$H$_4$—);

(2) a structural unit that contains one or more ethylene unsaturated bonds and is originated from a compound containing an amide group (—CONH$_2$), and a structural unit that contains one or more ethylene unsaturated bonds and is originated from a compound containing a methyl group (—CH$_3$) and a carbonyl group (C=O);

(3) a structural unit that contains one or more ethylene unsaturated bonds and is originated from a compound containing a carboxy group (—COOH) and a trifluoromethyl group (—CF$_3$), and a structural unit that contains one or more ethylene unsaturated bonds and is originated from a compound containing a methyl group (—CH$_3$) and a carbonyl group (C=O); and (4) a structural unit that contains one or more ethylene unsaturated bonds and is originated from a compound containing a carboxy group (—COOH) and a methyl group (—CH$_3$), a structural unit that contains one or more ethylene unsaturated bonds and is originated from a compound containing a methyl group (—CHs) and a carbonyl group (C=O), and a structural unit that contains one or more ethylene unsaturated bonds and is originated from a compound containing a phenylene group (—C$_6$H$_4$—).

(5) a structural unit that contains one or more ethylene unsaturated bonds and is originated from a compound containing a carboxy group (—COOH) and a methyl group (—CH$_3$), and a structural unit that contains one or more ethylene unsaturated bonds and is originated from a compound containing an ether group (—O—).

[5] The polymer material made of a mixture of the polymer material as described in [3] and the polymer material as described in [4].

[6] The polymer material as described in any one of [1] to [4], including: a first structural unit that contains only one ethylene unsaturated bond and is originated from a compound containing one or more functional groups reactive to a gas; and a second structural unit that is originated from a compound containing a plurality of independent ethylene unsaturated bonds.

[7] The polymer material as described in [6], in which the polymer material contains 0.2 mol to 10 mol of the second structural unit with respect to 1 mol of the first structural unit.

[8] A sensor element including a quartz plate, an electrode made of a metal film provided on the quartz plate, and a sensing film provided on the electrode, in which the sensing film contains the polymer material as described in any one of [1] to [7].

[9] A gas measurement device including the sensor element as described in [8].

The polymer material according to the present disclosure has a structural unit that contains one or more ethylene unsaturated bonds and is originated from a compound containing one or more functional groups reactive to a gas. When the polymer material is incorporated in a sensing film of a sensor element having a quartz plate, an electrode made of a metal film provided on the quartz plate, and the sensing film provided on the electrode, the fundamental frequency of a quartz oscillator having the quartz plate and the electrode changes according to an amount of change that varies according to the type of gas adsorbed onto the sensing film. Therefore, the sensor element, which has the sensing film containing the polymer material according to the present disclosure, can detect a plurality of types of gases.

Moreover, the gas measurement device according to the present disclosure includes a sensor element which can detect a plurality of types of gases due to having the sensing film containing the polymer material according to the present disclosure. Therefore, the types and number of sensor elements can be reduced and miniaturization and power saving can be achieved, for example, compared with a gas measurement device including the same number of sensor elements as the number of gases to be detected.

DETAILED DESCRIPTION

Hereinafter, the polymer material, sensor element, and gas measurement device according to the present disclosure will be described in detail with reference to the drawings.

[Sensor Element]

Figure 1:
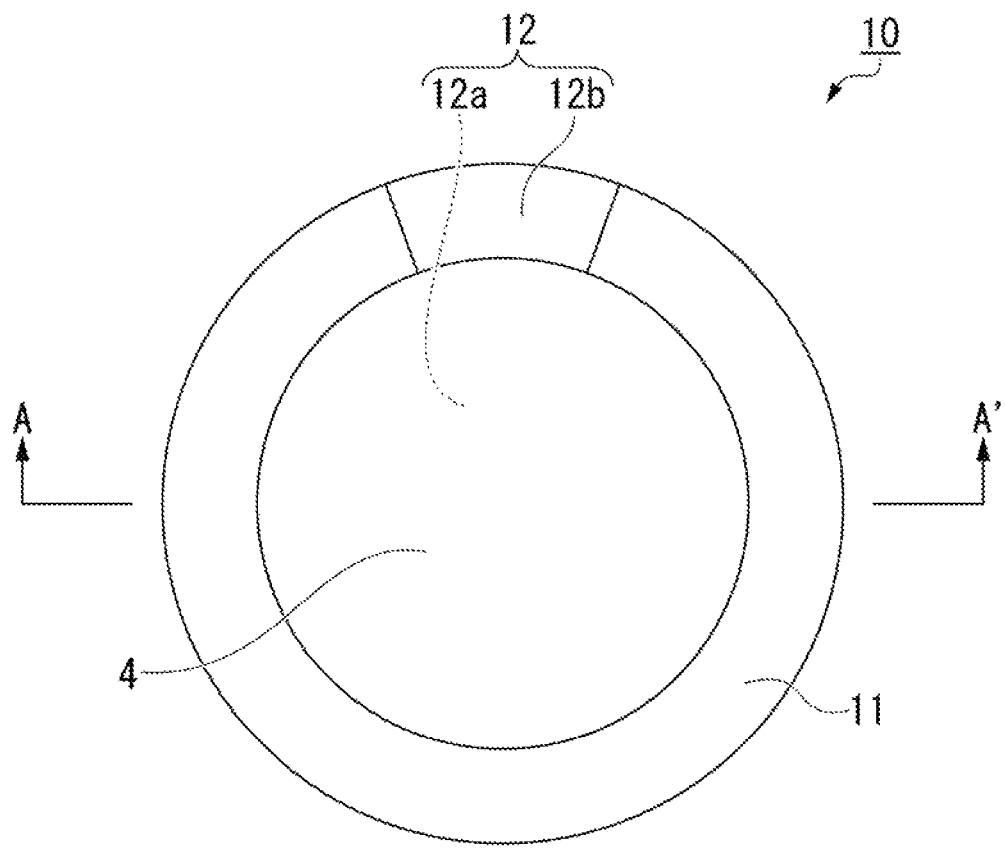
FIG. 1 is a plan view showing an example of the sensor element according to the present embodiment.
Figure 2:
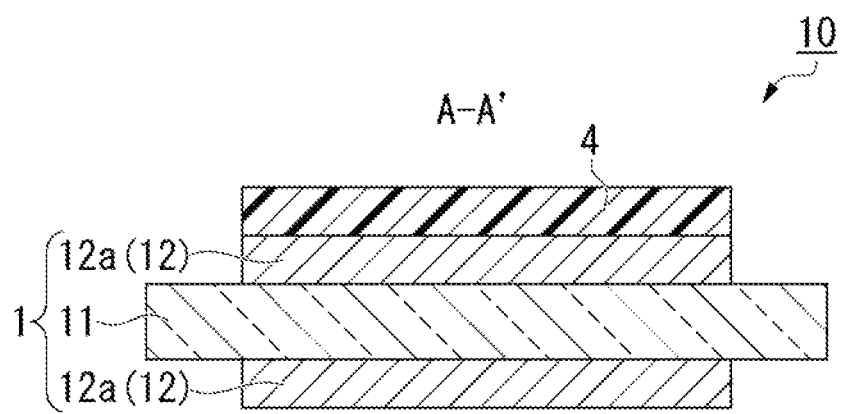
FIG. 2 is a cross-sectional view of the sensor element according to the present embodiment taken along line A-A' shown in FIG. 1.

FIG. 1 is a plan view showing an example of the sensor element according to the present embodiment. FIG. 2 is a cross-sectional view of the sensor element according 10 to the present embodiment taken along line A-A' shown in FIG. 1.

A sensor element 10 according to the present embodiment shown in FIG. 1 uses a quartz crystal microbalance (QCM) method to quantify the concentration of a gas to be detected. As shown in FIG. 1, the sensor element 10 according to the present embodiment has a substantially circular shape in plan view. As shown in FIG. 2, in the sensor element 10, a sensing film 4 is laminated on one of electrodes 12 provided on both surfaces of a quartz oscillator 1. The sensor element 10 is connected to a frequency measurement instrument, which measures the oscillation frequency (frequency) of the quartz oscillator 1 being oscillated and detects the amount of frequency change, by two lead wires (not illustrated) respectively electrically connected to the two electrodes 12. Known lead wires and frequency measurement instruments can be used as the lead wires and the frequency measurement instrument.

(Quartz Oscillator)

The quartz oscillator 1 has a quartz plate 11 and the electrodes 12 respectively provided on both surfaces of the quartz plate 11, as shown in FIG. 2. The fundamental frequency of the quartz oscillator 1 changes in proportion to the change in the mass of the sensing film 4 disposed on one electrode 12. That is, when a gas to be detected is adsorbed onto the sensing film 4 and the mass of the sensing film 4 changes, the fundamental frequency of the quartz oscillator 1 changes. Moreover, in the sensor element 10 according to the present embodiment, the fundamental frequency of the quartz oscillator 1 changes according to an amount of change that varies according to the type of gas adsorbed onto the sensing film 4.

A known quartz plate can be used as the quartz plate 11. The sensor element 10 according to the present embodiment uses the quartz plate 11 having a substantially circular shape in plan view. The diameter of the quartz plate 11 may be, for example, 0.1 mm to 25 mm and is preferably 0.5 mm to 10 mm. The thickness of the quartz plate 11 may be, for example, 50 μm to 500 μm and is preferably 100 μm to 300 μm. The fundamental frequency of the quartz oscillator 1 when an electric field is applied to the electrodes 12 is determined by the thickness of the quartz plate 11. The thinner the quartz plate 11 is, the higher the sensitivity is. Meanwhile, the thicker the quartz plate 11 is, the wider the detectable gas concentration range is. Accordingly, the thickness of the quartz plate 11 can be appropriately determined according to the use of the sensor element 10 such as quantifying the concentration of a gas to be detected.

In the sensor element 10 according to the present embodiment, the case where the quartz plate 11 having a substantially circular shape in plan view is used has been described as an example, but the shape of the quartz plate 11 is not limited to a substantially circular shape in plan view, and can be appropriately determined according to the use of the sensor element 10.

The electrodes 12 are made of metal films respectively provided on both surfaces of the quartz plate 11. Each of the electrodes 12 has, in plan view, a circular center region 12a having the same center as the quartz plate 11 and a connection region 12b extending from the edge of the center region 12a to the edge of the quartz plate 11.

The center region 12a of one electrode 12 is used as a sensing film-forming surface of the quartz oscillator 1 on which the sensing film 4 is formed. The center region 12a of one electrode 12 is covered with the sensing film 4 having substantially the same shape as the center region 12a in plan view, as shown in FIGS. 1 and 2.

Moreover, the connection region 12b of the electrode 12 is exposed on the surface of the sensor element 10, as shown in FIG. 1. The connection region 12b is a region for connecting the lead wires (not illustrated) that electrically connect the sensor element 10 and the frequency measurement instrument. The connection regions 12b of the two electrodes 12 may be disposed at positions overlapping each other in plan view, or may be disposed at positions not overlapping each other in plan view.

The electrode 12 is made of a metal film. For example, gold, silver, copper, platinum, or the like can be used as the material of the metal film. The electrode 12 preferably has a positive charge. The electrode 12 can be formed by a known method. In the sensor element 10 according to the present embodiment, the case where the electrode 12 has the circular center region 12a and the connection region 12b extending from the edge of the center region 12a to the edge of the quartz plate 11 has been described as an example, but the planar shape and thickness of the electrode 12 are not particularly limited.

(Sensing Film)

The sensing film 4 is formed on the sensing film-forming surface of the quartz oscillator 1. The sensing film 4 contains the polymer material according to the present embodiment. The sensing film 4 may be made of only the polymer material according to the present embodiment, or may contain, in addition to the polymer material according to the present embodiment, a polymer material different from the polymer material according to the present embodiment as long as the effects of the present disclosure can be obtained.

The shape of the polymer material according to the present embodiment contained in the sensing film 4 is not particularly limited, and may be, for example, a film shape or a particulate shape.

The sensing film 4 in the present embodiment is preferably formed by adhering the particulate polymer material according to the present embodiment onto the sensing film-forming surface of the quartz oscillator 1. The particulate polymer material forming the sensing film 4 may have a substantially spherical shape, an irregular shape, or a shape formed by aggregating a plurality of particles.

The thickness of the sensing film 4 may be, for example, 0.1 μm to 100 μm, is preferably 1 μm to 50 μm, and can be appropriately determined according to the type and concentration of the gas to be detected and the like. When the thickness of the sensing film 4 is 0.1 μm or greater, the amount of the adsorbable gas increases, which is preferable. When the thickness of the sensing film 4 is 100 μm or less, the sensing film 4 can be easily formed, which is preferable.

The polymer material contained in the sensing film 4 has a structural unit that contains one or more ethylene unsaturated bonds and is originated from a compound containing one or more functional groups reactive to a gas.

In the polymer material according to the present embodiment, the structural unit originated from a compound containing an ethylene unsaturated bond refers to a structural unit in which the chemical structure of a portion other than the ethylene unsaturated bonds in the compound, and the chemical structure of a portion other than a portion corresponding to the ethylene unsaturated bonds in the structural unit in the polymer material are the same.

Moreover, in the present embodiment, the plurality of independent ethylene unsaturated bonds, which will be described later, refer to a plurality of ethylene unsaturated bonds that do not form a conjugated diene with each other. In the polymer material according to the present embodiment, one or more ethylene unsaturated bonds may remain in a structural unit that is originated from a compound containing a plurality of independent ethylene unsaturated bonds. That is, all of portions corresponding to the plurality of ethylene unsaturated bonds in the compound may be incorporated into a polymer chain, or only portions corresponding to some ethylene unsaturated bonds may be incorporated into a polymer chain.

The polymer material according to the present embodiment may contain only one type of the structural unit that contains one or more ethylene unsaturated bonds and is originated from a compound containing one or more functional groups reactive to a gas, or may contain two or more types thereof.

Functional groups in the compound, which contains one or more ethylene unsaturated bonds and contains one or more functional groups reactive to a gas, may be any groups as long as the groups are reactive to a gas, and can be appropriately determined according to the type of gas to be detected. For example, one or more selected from a carboxy group (—COOH), a carbonyl group (C=O), an amide group (—CONH$_2$), a hydroxy group (—OH), a nitro group (—NO$_2$), and an amino group (—NH$_2$) can be used as the functional groups.

In order to improve the selectivity of detection when the detection object is a plurality of gases, the polymer material according to the present embodiment may have a structural unit originated from a compound containing a functional group that changes the selectivity. The functional group that changes the selectivity can be appropriately determined according to the type of gas to be detected, and, for example, one or more selected from a methyl group (—CH$_3$), a phenylene group (—C$_6$H$_3$—), a trifluoromethyl group (—CF$_3$) and an ether group (—O—) can be used.

In the sensor element 10 according to the present embodiment, whether the fundamental frequency of the quartz oscillator 1 decreases or increases due to adsorption of a gas onto the sensing film 4 is determined by the type and number of structural units of the polymer material contained in the sensing film 4.

In the case of the sensor element 10 in which the fundamental frequency of the quartz oscillator 1 decreases due to adsorption of a gas onto the sensing film 4, it is preferable to use, as the polymer material, a polymer material which contains: a structural unit that contains one or more ethylene unsaturated bonds and is originated from a compound containing a carboxy group (—COOH) and a methyl group (—CH$_3$); and a structural unit that contains one or more ethylene unsaturated bonds and is originated from a compound containing a methyl group (—CH$_3$) and a carbonyl group (C=O).

Moreover, in the case of the sensor element 10 in which the fundamental frequency of the quartz oscillator 1 increases due to adsorption of a gas onto the sensing film 4, it is preferable to use, as the polymer material, a polymer material containing any one of (1) to (5) below:

(1) a structural unit that contains one or more ethylene unsaturated bonds and is originated from a compound containing a carboxy group (—COOH) and a methyl group (—CH$_3$), and a structural unit that contains one or more ethylene unsaturated bonds and is originated from a compound containing a phenylene group (—C$_6$H$_4$—);

(2) a structural unit that contains one or more ethylene unsaturated bonds and is originated from a compound containing an amide group (—CONH$_2$), and a structural unit that contains one or more ethylene unsaturated bonds and is originated from a compound containing a methyl group (—CH$_3$) and a carbonyl group (C=O);

(3) a structural unit that contains one or more ethylene unsaturated bonds and is originated from a compound containing a carboxy group (—COOH) and a trifluoromethyl group (—CF$_3$), and a structural unit that contains one or more ethylene unsaturated bonds and is originated from a compound containing a methyl group (—CH$_3$) and a carbonyl group (C=O); and (4) a structural unit that contains one or more ethylene unsaturated bonds and is originated from a compound containing a carboxy group (—COOH) and a methyl group (—CH$_3$), a structural unit that contains one or more ethylene unsaturated bonds and is originated from a compound containing a methyl group (—CH$_3$) and a carbonyl group (C=O), and a structural unit that contains one or more ethylene unsaturated bonds and is originated from a compound containing a phenylene group (—C$_6$H$_4$—).

(5) a structural unit that contains one or more ethylene unsaturated bonds and is originated from a compound containing a carboxy group (—COOH) and a methyl group (—CH$_3$), and a structural unit that contains one or more ethylene unsaturated bonds and is originated from a compound containing an ether group (—O—).

In the polymer material according to the present embodiment, the structural unit, which contains one or more ethylene unsaturated bonds and is originated from a compound containing one or more functional groups reactive to a gas, preferably includes: a first structural unit that contains only one ethylene unsaturated bond and is originated from a compound containing one or more functional groups reactive to a gas; and a second structural unit that is originated from a compound containing a plurality of independent ethylene unsaturated bonds. In this case, the polymer material has a crosslinked structure, and thus the gas is easily adsorbed onto the sensor element 10, which is preferable.

Examples of a compound serving as the first structural unit include methacrylic acid (MAA), acrylamide (AA), 2-(trifluoromethyl)acrylic acid (TFMAA), ethylene glycol methacrylate, methacrylamide, acrylic acid, and allyl alcohol.

It is preferable to use, as the compound serving as the first structural unit, one or more types of compounds having a functional group suitable for the type of gas to be detected, among the aforementioned compounds.

Examples of a compound serving as the second structural unit include ethylene glycol dimethacrylate (EGDMA), o-divinylbenzene, m-divinylbenzene, p-divinylbenzene, allyl ether 1,5-hexadiene-3,4-diol, and diallylamine.

It is preferable to use, as the compound serving as the second structural unit, one or more types of compounds having a functional group suitable for the type of gas to be detected, among the aforementioned compounds.

The polymer material according to the present embodiment preferably contains 0.2 mol to 10 mol of the second structural unit with respect to 1 mol of the first structural unit. In the present embodiment, the molar ratio between the first structural unit and the second structural unit is considered to be the same as the molar ratio between the compound serving as the first structural unit and the compound serving as the second structural unit, which are used as raw materials.

When the polymer material according to the present embodiment contains 0.2 mol or greater of the second structural unit with respect to 1 mol of the first structural unit, the second structural unit sufficiently functions as a crosslinking agent. Therefore, a polymer material sufficiently having a crosslinked structure is obtained, and a sensing film 4 onto which a gas is easily adsorbed can be formed, which is preferable. When the polymer material according to the present embodiment contains 10 mol or less of the second structural unit with respect to 1 mol of the first structural unit, a polymer material having favorable flexibility is obtained, and the flexibility of a sensing film 4 containing the polymer material is improved. Moreover, when 10 mol or less of the second structural unit is contained with respect to 1 mol of the first structural unit, a sensing film 4 having a uniform thickness and/or a sufficiently thin sensing film 4 can be easily formed without excessively increasing the particle diameter of the particulate polymer material, which is preferable. Furthermore, when 10 mol or less of the second structural unit is contained with respect to 1 mol of the first structural unit, gaps through which the gas to be detected can enter are sufficiently secured around the functional groups which are reactive to a gas and included in the polymer material. Therefore, a sensing film 4 onto which a gas is easily adsorbed can be formed, which is preferable.

It is preferable that the molar ratio between the first structural unit and the second structural unit in the polymer material according to the present embodiment be appropriately determined according to the type of gas to be detected so that the number of functional groups is suitable for the type of gas to be detected within the above range.

The sensing film 4 in the present embodiment may contain only one type of polymer material, or may contain only two or more types of polymer materials. When the sensing film 4 contains two or more types of polymer materials, for example, a mixture, which is obtained by mixing, in an arbitrary ratio, a polymer material that reduces the fundamental frequency of the quartz oscillator 1 due to adsorption of a gas onto the sensing film 4 and a polymer material that increases the fundamental frequency of the quartz oscillator 1 due to adsorption of a gas onto the sensing film 4, can be used. The polymer material that reduces the fundamental frequency of the quartz oscillator 1 due to adsorption of a gas onto the sensing film 4, and the polymer material that increases the fundamental frequency of the quartz oscillator 1 due to adsorption of a gas onto the sensing film 4 can be mixed, for example, in a molar ratio of 1:1. When the sensing film 4 contains two or more types of polymer materials, a sensor element 10, which has a different amount of frequency change due to gas adsorption than when the sensing film 4 contains one type of polymer material, is obtained. Therefore, when the sensing film 4 contains two or more types of polymer materials, the selectivity of detection when the detection object is a plurality of specific gases may be improved.

(Method for Producing Polymer Material)

The polymer material according to the present embodiment can be produced using known methods such as a solution polymerization method and a dispersion polymerization method, which use an organic solvent as a solvent, and an emulsion polymerization method and a suspension polymerization method, which use water as a solvent. Specifically, the polymer material according to the present embodiment can be produced, for example, using the dispersion polymerization method described below. First, the compound serving as the first structural unit, the compound serving as the second structural unit, and a solvent are mixed, and stirred in an inert gas atmosphere, such as a nitrogen atmosphere, to obtain a mixed solution.

As the solvent used for the mixed solution, a solvent, in which the compound serving as the first structural unit, the compound serving as the second structural unit, and a polymerization initiator are dissolved and a polymer produced by a polymerization reaction is insoluble, is used. Specifically, acetonitrile, toluene, hexane, chloroform, dimethyl formamide, cyclohexane, methanol, dimethyl sulfoxide, 1-methoxy-2-propanol, or the like can be used as the solvent, and the solvent can be appropriately determined according to the types of the compound serving as the first structural unit, the compound serving as the second structural unit, and the polymerization initiator.

Next, a polymerization initiator is added to the mixed solution, and the resultant is stirred in an inert gas atmosphere, such as a nitrogen atmosphere, to obtain a raw material solution.

A known polymerization initiator can be used as the polymerization initiator contained in the raw material solution. Specifically, azobisisobutyronitrile, benzoyl peroxide, azobisdimethylvaleronitrile, potassium persulfate, dimethyl azobisisobutyrate, or the like can be used as the polymerization initiator. The added amount of the polymerization initiator may be, for example, 0.1% by mass to 3.0% by mass with respect to the amount of the compound serving as the first structural unit, and can be appropriately determined according to the type of the compound serving as the first structural unit.

Subsequently, while the raw material solution is stirred, the raw material solution is irradiated with ultraviolet rays (UV) to cause a polymerization reaction, thereby producing a particulate polymer compound. Moreover, the particulate polymer compound is collected through suction filtration from the raw material solution after the reaction, washed with a poor solvent multiple times, and vacuum-dried, for example, at 80° C. for 12 hours or longer. Through the aforementioned processes, the polymer material according to the present embodiment, which is composed of the particulate polymer compound, is obtained.

"Method for Manufacturing Sensor Element"

Figure 3:
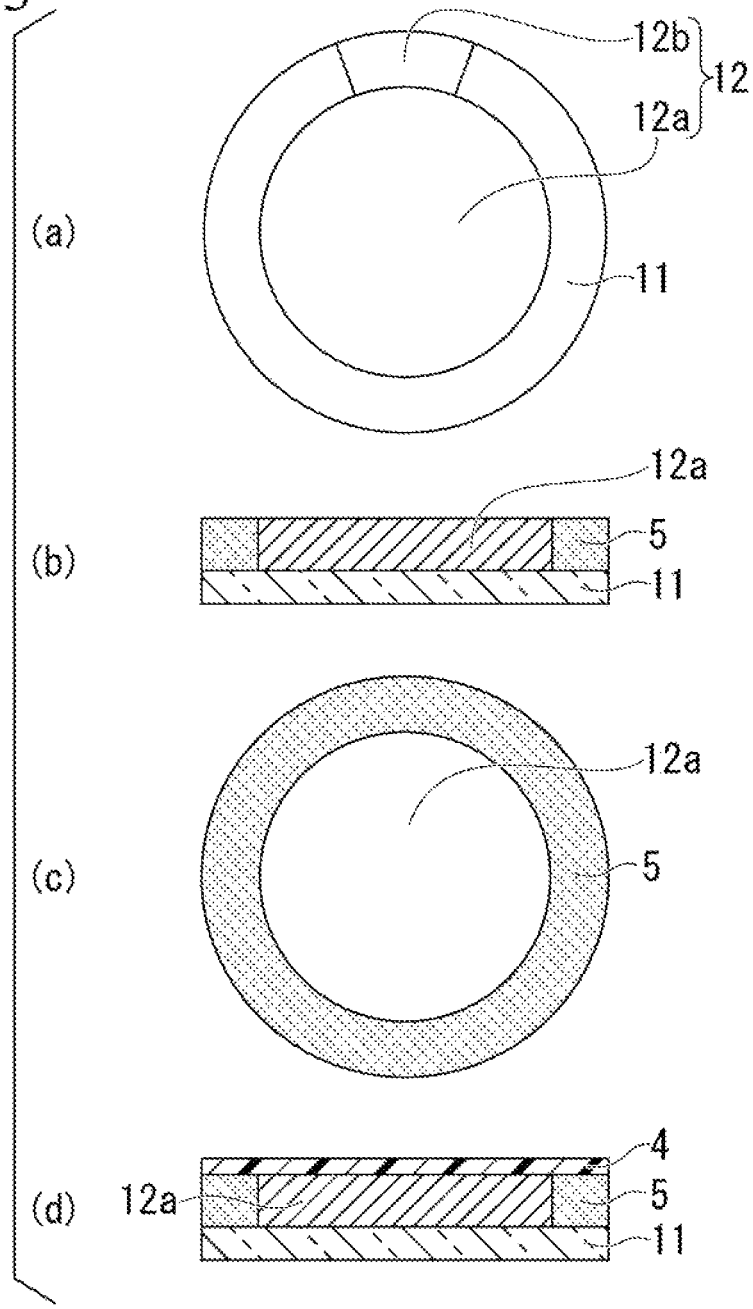
FIG. 3 is a process diagram for explaining an example of a method for manufacturing the sensor element according to the present embodiment.

Next, a method for manufacturing the sensor element according to the present embodiment will be described with an example. FIG. 3 is a process diagram for explaining an example of a method for manufacturing the sensor element according to the present embodiment. (a) of FIG. 3 and (c) of FIG. 3 are plan views of the sensor element during manufacture. (b) of FIG. 3 and (d) of FIG. 3 are cross-sectional views of the sensor element during manufacture, corresponding to a position taken along line A-A' shown in FIG. 1.

In the method for manufacturing the sensor element 10 according to the present embodiment, as shown in (a) of FIG. 3, a quartz oscillator 1, which has a quartz plate 11 and electrodes 12 respectively provided on both surfaces of the quartz plate 11, is first prepared. Then, both surfaces of the quartz oscillator 1 are washed using a known method such as ultrasonic washing, ultraviolet irradiation, an ozone treatment, or a plasma treatment.

Subsequently, a protective mask is formed on the surface of the quartz oscillator 1. As shown in (b) of FIG. 3 and (c) of FIG. 3, a protective mask 5 is formed on one surface of the quartz oscillator 1 so as to cover the surface of the quartz oscillator 1 while exposing only the center region 12a (sensing film-forming surface) of the electrode 12. The protective mask 5 is also formed on the entire surface of the other surface of the quartz oscillator 1 (the electrode and the protective mask 5 on the other surface are not illustrated). A known substance such as a photocurable resin film, for example, an ultraviolet curable resin film, a thermosetting resin film, a thermally peelable resin sheet, or a masking tape can be used as the protective mask 5.

(Sensing Film Forming Process)

Next, as shown in (d) of FIG. 3, a sensing film 4 that adsorbs a gas to be detected is formed by the following method on the center region 12a (sensing film-forming surface) of the electrode 12 in the quartz oscillator 1 on which the protective mask 5 is formed.

First, a dispersion solution is prepared by dispersing the aforementioned particulate polymer material in a dispersion solvent.

For example, methanol, ethanol, acetone, dimethyl formamide (DMF), dimethyl sulfoxide (DMSO), or the like can be used as the dispersion solvent, and the dispersion solvent is appropriately determined according to the type of polymer material. When the sensing film 4 is formed by adhering the particulate polymer material to the sensing film-forming surface of the quartz oscillator 1, a solvent that does not dissolve the particulate polymer material is used as the dispersion solvent. When a dispersion solvent that does not dissolve the particulate polymer material is used, the particulate polymer material can be adhered to the sensing film-forming surface of the quartz oscillator 1 while maintaining the particle shape of the polymer material.

The dispersibility of the polymer material in the dispersion solution varies according to the type of dispersion solvent. Moreover, since the volatilization rate varies according to the type of dispersion solvent, the aggregating properties of the polymer material in the dispersion solution applied to the sensing film-forming surface of the quartz oscillator 1 are different, and the surface area of the polymer material adhered to the sensing film-forming surface is changed. Consequently, the characteristics of the sensing film 4, which is obtained by applying the dispersion solution onto the sensing film-forming surface of the quartz oscillator 1 and then drying the resultant, can be varied according to the type of dispersion solvent. Therefore, the sensor elements 10 having different amounts of frequency change can be manufactured by changing the type of dispersion solvent.

Subsequently, the dispersion solution is applied to the center region 12a (sensing film-forming surface) of the electrode 12 in the quartz oscillator 1 using a known method. Thereafter, the quartz oscillator 1 coated with the dispersion solution is vacuum-dried, for example, at 80° C. for 12 hours or longer. By performing the aforementioned processes, as shown in (d) of FIG. 3, the sensing film 4 containing the polymer material adhered to the sensing film-forming surface of the quartz oscillator 1 is obtained.

Next, the protective mask 5 is removed from the quartz oscillator 1 on which the sensing film 4 is formed. The protective mask 5 can be removed by a known method according to the material of the protective mask 5 used. For example, when a thermally peelable resin sheet is used as the protective mask 5, the protective mask 5 can be removed by a method for heating at a predetermined temperature for a predetermined time. Moreover, for example, when a protective mask made of a thermosetting resin or a photocurable resin is used as the protective mask 5, the protective mask 5 can be removed by a method of dissolving the protective mask in an organic solvent or the like.

Through the aforementioned processes, the sensor element 10 according to the present embodiment is obtained.

The polymer material according to the present embodiment has a structural unit that contains one or more ethylene unsaturated bonds and is originated from a compound containing one or more functional groups reactive to a gas. When the polymer material according to the present embodiment is incorporated in the sensing film 4 of the sensor element 10 having the quartz plate 11, the electrode 12 made of a metal film provided on the quartz plate 11, and the sensing film 4 provided on the electrode 12, the fundamental frequency of the quartz oscillator 1 changes according to an amount of change that varies according to the type of gas adsorbed onto the sensing film 4. Therefore, the sensor element 10, which has the sensing film 4 containing the polymer material according to the present embodiment, can detect a plurality of types of gases.

The sensor element 10 according to the present embodiment can be preferably used, for example, when the gas to be detected is one or more selected from carbon dioxide, ethanol, acetone, formaldehyde, methane, water, hydrogen sulfide, nitrogen dioxide, and ammonia, and can be particularly preferably used when the gases to be detected are ethanol and acetone.

"Gas Measurement Device"

Figure 4:
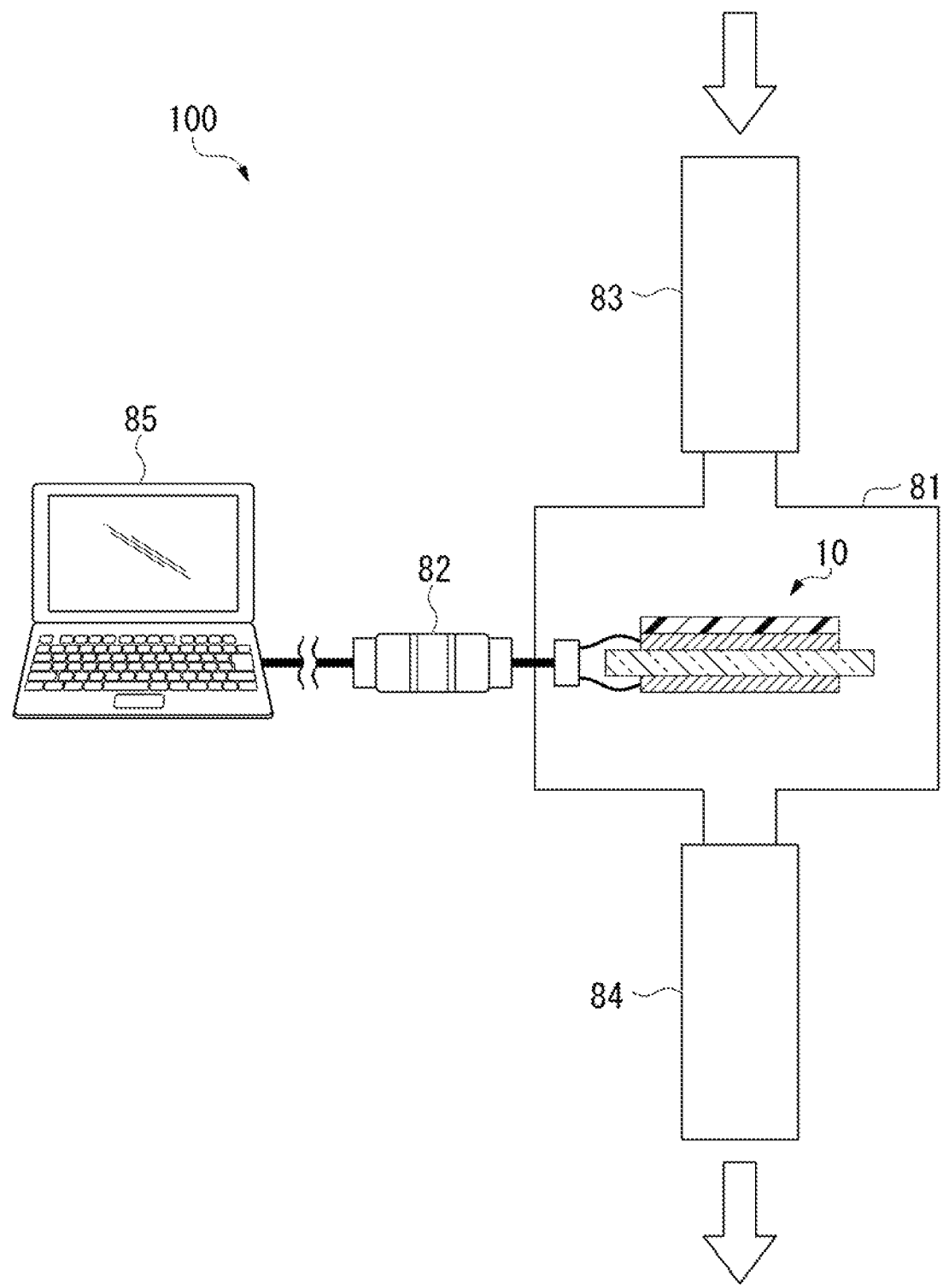
FIG. 4 is a schematic diagram showing the gas measurement device according to the present embodiment.

Next, the gas measurement device according to the present embodiment will be described with an example. FIG. 4 is a schematic diagram showing the gas measurement device according to the present embodiment. A gas measurement device 100 according to the present embodiment includes the sensor element 10 according to the present embodiment, a flow cell 81, a gas supply means 83, a gas discharge means 84, a frequency measurement instrument 82, and a personal computer 85.

The flow cell 81 stores the sensor element 10. In the gas measurement device 100 according to the present embodiment, the sensor element 10 is brought into contact with the gas to be detected in the flow cell 81 to measure the concentration of the gas to be detected.

The gas supply means 83 supplies the gas to be detected and a base gas to the flow cell 81 in a predetermined mixing ratio at a predetermined flow rate.

The gas discharge means 84 discharges the gas to be detected and the base gas from to the flow cell 81.

The frequency measurement instrument 82 measures the oscillation frequency (frequency) of the quartz oscillator 1 being oscillated and detects the amount of frequency change. The frequency measurement instrument 82 is electrically connected to the connection regions 12b of the two electrodes 12 of the sensor element 10 by lead wires.

The personal computer 85 is communicably connected to the frequency measurement instrument 82 in a wired or wireless manner, and outputs the results detected by the frequency measurement instrument 82.

In the gas measurement device 100 according to the present embodiment, known members can be used as members other than the sensor element 10.

Since the gas measurement device 100 according to the present embodiment includes the sensor element 10 according to the present embodiment, a plurality of types of gases can be detected by one sensor element 10. Accordingly, the types and number of sensor elements can be reduced and miniaturization and power saving can be achieved, for example, compared with a gas measurement device including the same number of sensor elements as the number of gases to be detected.

In the present embodiment, the gas measurement device 100 including one sensor element 10 has been described as an example, but a plurality of sensor elements may be included in a gas measurement device.

Hereinbefore, the embodiments of the present disclosure have been described in detail, but each configuration in each embodiment, a combination thereof, or the like is an example, and the additions, omissions, substitutions, and other modifications of the configuration can be made without departing from the spirit of the present disclosure.

EXAMPLE

"Production of Polymer Materials 1 to 5, 7 and 9"

The compound serving as the first structural unit shown in Table 1, the compound serving as the second structural unit shown in Table 1, and the solvent shown in Table 1 were mixed in the used amount shown in Table 1, and stirred for 45 minutes in a nitrogen atmosphere at a rotation speed of 1,500 rpm using a stirrer to obtain a mixed solution.

Subsequently, azobisisobutyronitrile (Tokyo Chemical Industry Co., Ltd.), which is a polymerization initiator, was added to the mixed solution so that the amount of the azobisisobutyronitrile was 1.5% by mass with respect to the amount of the compound serving as the first structural unit, and stirred for 15 minutes in a nitrogen atmosphere at a rotation speed of 1,500 rpm using the stirrer to obtain a raw material solution.

Thereafter, while the raw material solution was stirred at a rotation speed of 1.500 rpm using the stirrer, the raw material solution was irradiated with ultraviolet rays (UV) for the time shown in Table 1 to cause a polymerization reaction. The particulate polymer compound produced after the reaction was collected through suction filtration from the raw material solution after the reaction, washed with acetonitrile, then further washed with methanol, and vacuum-dried at 80° C. for 12 hours or longer. Through the aforementioned processes, polymer materials 1 to 5, 7 and 9, which were composed of the particulate polymer compound, were obtained.

"Production of Polymer Material 6"

The polymer material 1 was mixed with the polymer material 3 in a molar ratio of 1:1 to obtain a polymer material 6.

"Production of Dispersion Solutions 1 to 9 of Polymer Materials"

The polymer materials 1 to 9 obtained by the aforementioned production method were dispersed in the dispersion solvents shown in Table 2, respectively, to prepare dispersion solutions 1 to 9 having a concentration of 2% by mass. In all of the dispersion solutions 1 to 9, the polymer material was not dissolved in the dispersion solvent.

The molar ratio (molar ratio between the compound serving as the first structural unit and the compound serving as the second structural unit, which are used as raw materials) of the first structural unit to the second structural unit in each of the polymer materials 1 to 9 contained in the dispersion solutions 1 to 9 obtained as described above is shown in Table 2.

TABLE 1

| Polymer material | Compound serving as first structural unit | | Compound serving as second structural unit | | Compound serving as second structural unit | | Solvent | | UV irradiation |
|---|---|---|---|---|---|---|---|---|---|
| | Compound name | mmol | Compound name | mmol | Compound name | mmol | Solvent name | mL | time (h) |
| 1 | MAA | 1.2 | EGDMA | 1.2 | — | — | Acetonitrile | 5 | 2.5 |
| 2 | MAA | 1.2 | EGDMA | 1.2 | — | — | Acetonitrile | 5 | 2.5 |
| 3 | MAA | 1.2 | DVB | 1.2 | — | — | Acetonitrile | 5 | 4 |
| 4 | AA | 1.2 | EGDMA | 1.2 | — | — | Acetonitrile | 5 | 2.5 |
| 5 | TFMAA | 1.2 | EGDMA | 1.2 | — | — | Methanol | 5 | 2.5 |
| 6 | MAA | 1.2 | EGDMA | 0.6 | DVB | 0.6 | Acetonitrile | 5 | 2.5 |
| 7 | AA | 1.2 | EGDMA | 1.2 | — | — | 1-Methoxy-2-propanol | 5 | 2.5 |
| 8 | TFMAA | 1.2 | EGDMA | 1.2 | — | — | Chloroform | 5 | 4 |
| 9 | MMA | 1.2 | AE | 1.2 | — | — | Acetonitrile | 5 | 2.5 |

TABLE 2

| | Dispersion solution of polymer material (sensor element) | Compound serving as first structural unit | Compound serving as second structural unit | Dispersion solvent | Molar ratio first structural unit:second structural unit | Concentration of gas to be detected (ppm) | Amount of frequency change (Hz) | | Selectivity (Acetone/ethanol) |
|---|---|---|---|---|---|---|---|---|---|
| | | | | | | | Acetone | Ethanol | |
| Example 1 | 1 | MAA | EGDMA | Methanol | 1:1 | 4 | −4 | −18 | 0.22 |
| Example 2 | 1 | MAA | EGDMA | Methanol | 1:1 | 40 | −11 | −42 | 0.26 |
| Example 3 | 2 | MAA | EGDMA | Acetone | 1:1 | 4 | −2 | −11 | 0.18 |
| Example 4 | 2 | MAA | EGDMA | Acetone | 1:1 | 40 | −10 | −20 | 0.50 |
| Example 5 | 3 | MAA | DVB | Methanol | 1:1 | 4 | +6 | +24 | 0.25 |
| Example 6 | 3 | MAA | DVB | Methanol | 1:1 | 40 | +32 | +53 | 0.60 |
| Example 7 | 4 | AA | EGDMA | Acetone | 1:1 | 4 | +4 | +12 | 0.33 |
| Example 8 | 4 | AA | EGDMA | Acetone | 1:1 | 40 | +11 | +19 | 0.58 |
| Example 9 | 5 | TFMAA | EGDMA | Acetone | 1:1 | 4 | +3 | +5 | 0.60 |
| Example 10 | 5 | TFMAA | EGDMA | Acetone | 1:1 | 40 | +8 | +6 | 1.33 |
| Example 11 | 6 | MAA | DVB/EGDMA | Methanol | 1:1 | 4 | +2 | +6 | 0.33 |
| Example 12 | 6 | MAA | DVB/EGDMA | Methanol | 1:1 | 40 | +6 | +7 | 0.86 |
| Example 13 | 7 | MAA | DVB/EGDMA | Methanol | 1:1 | 4 | +15 | +28 | 0.54 |
| Example 14 | 7 | MAA | DVB/EGDMA | Methanol | 1:1 | 40 | +33 | +47 | 0.70 |
| Example 15 | 8 | AA | EGDMA | Methanol | 1:1 | 4 | +22 | +34 | 0.65 |
| Example 16 | 8 | AA | EGDMA | Methanol | 1:1 | 40 | +30 | +28 | 1.07 |
| Example 17 | 9 | TFMAA | EGDMA | Methanol | 1:1 | 4 | +15 | +39 | 0.38 |
| Example 18 | 9 | TFMAA | EGDMA | Methanol | 1:1 | 40 | +47 | +48 | 0.98 |
| Example 19 | 10 | MAA | AE | Methanol | 1:1 | 4 | +5 | +6 | 0.83 |
| Example 20 | 10 | MAA | AE | Methanol | 1:1 | 40 | +10 | +19 | 0.53 |

The following compounds were used as the compound serving as the first structural unit and the compound serving as the second structural unit listed in Tables 1 and 2.

"Compound Serving as First Structural Unit"

(MAA) Methacrylic acid (produced by Tokyo Chemical Industry Co., Ltd.)

(AA) Acrylamide (produced by Tokyo Chemical Industry Co., Ltd.)

(TFMAA) 2-(Trifluoromethyl)acrylic acid (produced by Tokyo Chemical Industry Co., Ltd.)

"Compound Serving as Second Structural Unit"

(DVB) Mixture of p-divinylbenzene and m-divinylbenzene (produced by Tokyo Chemical Industry Co., Ltd.)

(EGDMA) Ethylene glycol dimethacrylate (produced by Tokyo Chemical Industry Co., Ltd.)

(AE) Allyl ether (produced by Tokyo Chemical Industry Co., Ltd.)

"Manufacture of Sensor Elements 1 to 10"

Next, sensor elements 1 to 10 were manufactured by the following method.

First, as shown in (a) of FIG. 3, a quartz oscillator 1 (trade name: SEN-9E-H-10, fundamental frequency of 9 MHz, and manufactured by Tamadevice. Co., Ltd.), including a quartz plate 11 having a circular shape in plan view and a diameter of 8.7 mm and electrodes 12 respectively provided on both surfaces of the quartz plate 11 and having a center region 12a made of a gold film having a diameter of 5.0 mm, was prepared.

Subsequently, both surfaces of the quartz oscillator 1 were washed by a method in which the quartz oscillator 1 is immersed in acetone and subjected to ultrasonic washing for 15 minutes, immersed in pure water and subjected to ultrasonic washing for 15 minutes, and then dried at a temperature of 70° C. in the air.

Thereafter, a protective mask was formed on the surface of the quartz oscillator 1. As shown in (b) of FIG. 3 and (c) of FIG. 3, a protective mask 5 was formed on one surface of the quartz oscillator 1 so as to cover the surface of the quartz oscillator 1 while exposing only the center region 12a (sensing film-forming surface) of the electrode 12. The protective mask 5 was also formed on the entire surface of the other surface of the quartz oscillator 1 (the electrode and the protective mask 5 on the other surface are not illustrated). A thermally peelable resin sheet (trade name: REVALPHA (registered trademark), and manufactured by NITTO DENKO CORPORATION) was used as the protective mask 5.

(Sensing Film Forming Process)

Next, as shown in (d) of FIG. 3, a sensing film 4 was formed by the following method on the center region 12a (sensing film-forming surface) of the electrode 12 in the quartz oscillator 1 on which the protective mask 5 was formed.

Each of the dispersion solutions 1 to 7 of the polymer materials produced by the aforementioned method was applied to the center region 12a (sensing film-forming surface) of the electrode 12 in the quartz oscillator 1 by a method for adding 0.5 to 3.0 µL of a dispersion solution dropwise using a micropipette. Then, the quartz oscillator 1 coated with the dispersion solution was vacuum-dried at 80° C. for 12 hours or longer. As a result, as shown in (d) of FIG. 3, the sensing film 4 containing the particulate polymer material adhered to the sensing film-forming surface of the quartz oscillator 1 was obtained.

Subsequently, the protective mask 5 was removed from the quartz oscillator 1 on which the sensing film 4 was formed. The protective mask 5 was removed by a method for heating the protective mask 5 at a temperature of 110° C. for 10 minutes in a nitrogen atmosphere.

Through the aforementioned processes, sensor elements 1 to 7 were obtained.

Examples 1 to 20

Next, the amount of frequency change in the sensor element with respect to the gases to be detected satisfying the types and concentrations shown in Table 2 was examined using a gas measurement device 100 shown in FIG. 4, in which one of the sensor elements 1 to 10 shown in Table 2 and manufactured by the aforementioned method was installed as the sensor element 10 in a flow cell 81, and a THQ-100P-SW type (trade name) (manufactured by Tamadevice. Co., Ltd.) was installed as a frequency measurement instrument 82, by the following method.

An electric field was applied to the electrodes 12 of the quartz oscillator 1 from the frequency measurement instrument 82 through lead wires. While the oscillation frequency (frequency) of the quartz oscillator 1 being oscillated was continuously measured by the frequency measurement instrument 82, a gas supply means 83 and a gas discharge means 84 were operated to supply a base gas composed of dry air to the flow cell 81 at a flow rate of 500 cc/sec for 1 hour, thereby stabilizing a fundamental frequency (baseline).

Thereafter, the gas supply means 83 mixed the base gas and an acetone gas or ethanol gas, which is a gas to be detected, so that the gas concentration shown in Table 2 was satisfied, and supplied the mixture to the flow cell 81 at a flow rate of 500 cc/sec, and the oscillation frequency (frequency) was measured for 100 seconds by the frequency measurement instrument 82.

Subsequently, the base gas was supplied to the flow cell 81 at a flow rate of 500 cc/sec by the gas supply means 83 until the oscillation frequency (frequency) of the quartz oscillator 1 being oscillated reached the baseline.

Moreover, the frequency measurement instrument 82 detected the difference (amount of frequency change) between the average value of the oscillation frequencies (frequencies) obtained when the acetone gas or ethanol gas was supplied at the gas concentration shown in Table 2 and the baseline, and output the results thereof to a personal computer 85. The output amounts of frequency change are shown in Table 2.

Furthermore, the ratio (acetone gas/ethanol gas) of the amount of oscillation frequency change when the acetone gas was supplied to the amount of frequency change when the ethanol gas was supplied was calculated, and the selectivity of the sensor element was evaluated.

As shown in Table 2, in Examples 1 to 4 in which the sensor element 1 or the sensor element 2 was used, the frequency of the quartz oscillator 1 decreased due to the adsorption of the acetone gas or ethanol gas onto the sensing film 4.

Moreover, in Examples 1 to 4, the amounts of oscillation frequency change of the quartz oscillator 1 were significantly different between the case of the acetone gas and the case of the ethanol gas. Therefore, Examples 1 to 4 showed that the ratio (acetone gas/ethanol gas) of the amount of oscillation frequency change when the acetone gas was supplied to the amount of frequency change when the ethanol gas was supplied was sufficiently large that the difference from 1 is 0.3 or greater, and thus it can be confirmed that the selectivity between the acetone gas and the ethanol gas was favorable.

As shown in Table 2, in Examples 1 and 2 in which methanol was used as the dispersion solvent, the amount of frequency change was small both in the case of the acetone gas and in the case of the ethanol gas, compared with Examples 3 and 4 in which acetone was used as the dispersion solvent. This is presumed to be because the dispersibility of the polymer material in the dispersion solution varies according to the dispersion solvent, and the volatilization rate of acetone is faster than that of methanol, and thus the aggregating properties of the polymer material in the dispersion solution applied onto the sensing film-forming surface of the quartz oscillator 1 are different, and the surface area of the polymer material adhered to the sensing film-forming surface was larger in Examples 1 and 2 than in Examples 3 and 4.

As shown in Table 2, in Examples 5 to 20 in which one of the sensor elements 3 to 10 was used, the frequency of the quartz oscillator 1 increased due to the adsorption of the acetone gas or ethanol gas onto the sensing film 4.

Moreover, in Examples 5 to 20, the amounts of oscillation frequency change of the quartz oscillator 1 were significantly different between the case of the acetone gas and the case of the ethanol gas. Therefore, Examples 5 to 20 showed that the ratio (acetone gas/ethanol gas) of the amount of oscillation frequency change when the acetone gas was supplied to the amount of frequency change when the ethanol gas was supplied was sufficiently large that the difference from 1 is 0.3 or greater, and thus it can be confirmed that the selectivity between the acetone gas and the ethanol gas was favorable.

As shown in Table 2, when Example 11 is compared with Examples 1, 3, and 5, and when Example 12 is compared with Examples 2, 4, and 6, the ratio of the amount of oscillation frequency change when the acetone gas was supplied to the amount of frequency change when the ethanol gas was supplied is large. Consequently, it can be confirmed that by producing a polymer material using a plurality of compounds serving as the second structural unit and changing the type and amount of a functional group in the polymer material, whether a polymer material that reduces the fundamental frequency of the quartz oscillator 1 due to the adsorption of the acetone gas or ethanol gas onto the sensing film 4 is obtained, or a polymer material that increases the fundamental frequency of the quartz oscillator 1 due to the aforementioned adsorption is obtained is changed.

Moreover, when Example 13 is compared with Examples 1, 3, and 5, and when Example 14 is compared with Examples 2, 4, and 6, the ratio of the amount of oscillation frequency change when the acetone gas was supplied to the amount of frequency change when the ethanol gas was supplied is large. Consequently, it can be confirmed that by mixing the polymer material that reduces the fundamental frequency of the quartz oscillator 1 due to the adsorption of the acetone gas or ethanol gas onto the sensing film 4 with the polymer material that increases the fundamental frequency of the quartz oscillator 1 due to the aforementioned adsorption, the amount of frequency change is changed both in the case of the acetone gas and in the case of the ethanol gas, and the selectivity between the acetone gas and the ethanol gas is changed.

When Example 15 is compared with Example 7, when Example 16 is compared with Example 8, when Example 17 is compared with Example 9, and when Example 18 is compared with Example 10, the amounts of frequency change when the acetone gas and the ethanol gas are supplied are large. Consequently, it can be confirmed that by performing synthesis using a different solvent and lowering the degree of crosslinking, a space in a polymer chain became larger, making it easier for gas molecules to enter.

While preferred embodiments of the invention have been described and illustrated above, it should be understood that these are exemplary of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

EXPLANATION OF REFERENCES

1 Quartz oscillator
4 Sensing film
5 Protective mask
10 Sensor element
11 Quartz plate
12 Electrode
12a Center region
12b Connection region
81 Flow cell
82 Frequency measurement instrument
83 Gas supply means
84 Gas discharge means
85 Personal computer
100 Gas measurement device

What is claimed is:

1. A polymer material contained in a sensing film of a sensor element having a quartz plate, an electrode made of a metal film provided on the quartz plate, and a sensing film provided on the electrode, wherein
    the polymer material has a structural unit that contains one or more ethylene unsaturated bonds and is originated from a compound containing one or more functional groups reactive to a gas.
2. The polymer material according to claim 1, wherein the functional groups are one or more selected from a carboxy group (—COOH), a carbonyl group (C=O), and an amide group (—CONH$_2$).
3. The polymer material according to claim 1, wherein the polymer material contains a structural unit that contains one or more ethylene unsaturated bonds and is originated from a compound containing a carboxy group (—COOH) and a methyl group (—CH$_3$), and a structural unit that contains one or more ethylene unsaturated bonds and is originated from a compound containing a methyl group (—CH$_3$) and a carbonyl group (C=O).
4. The polymer material according to claim 1, the polymer material containing any one of (1) to (5) below:
    (1) a structural unit that contains one or more ethylene unsaturated bonds and is originated from a compound containing a carboxy group (—COOH) and a methyl group (—CH$_3$), and a structural unit that contains one or more ethylene unsaturated bonds and is originated from a compound containing a phenylene group (—C$_6$H$_4$—);
    (2) a structural unit that contains one or more ethylene unsaturated bonds and is originated from a compound containing an amide group (—CONH$_2$), and a structural unit that contains one or more ethylene unsaturated bonds and is originated from a compound containing a methyl group (—CH$_3$) and a carbonyl group (C=O);
    (3) a structural unit that contains one or more ethylene unsaturated bonds and is originated from a compound containing a carboxy group (—COOH) and a trifluoromethyl group (—CF$_3$), and a structural unit that contains one or more ethylene unsaturated bonds and is originated from a compound containing a methyl group (—CH$_3$) and a carbonyl group (C=O);
    (4) a structural unit that contains one or more ethylene unsaturated bonds and is originated from a compound containing a carboxy group (—COOH) and a methyl group (—CH$_3$), a structural unit that contains one or more ethylene unsaturated bonds and is originated from a compound containing a methyl group (—CH$_3$) and a carbonyl group (C=O), and a structural unit that contains one or more ethylene unsaturated bonds and is originated from a compound containing a phenylene group (—C$_6$H$_4$—); and
    (5) a structural unit that contains one or more ethylene unsaturated bonds and is originated from a compound containing a carboxy group (—COOH) and a methyl group (—CH$_3$), and a structural unit that contains one or more ethylene unsaturated bonds and is originated from a compound containing an ether group (—O—).
5. The polymer material made of a mixture of the polymer material according to claim 1, wherein the polymer material contains the structural unit that contains one or more ethylene unsaturated bonds and is originated from the compound containing the carboxy group (—COOH) and the methyl group (—CH$_3$), and the structural unit that contains one or more ethylene unsaturated bonds and is originated from the compound containing the methyl group (—CH$_3$) and the carbonyl group (C=O),
    and the polymer material containing any one of (1) to (5) below:
    (1) the structural unit that contains one or more ethylene unsaturated bonds and is originated from the compound containing the carboxy group (—COOH) and the methyl group (—CH$_3$), and the structural unit that contains one or more ethylene unsaturated bonds and is originated from the compound containing the phenylene group (—C$_6$H$_4$—);
    (2) the structural unit that contains one or more ethylene unsaturated bonds and is originated from the compound containing the amide group (—CONH$_2$), and the structural unit that contains one or more ethylene unsaturated bonds and is originated from the compound containing the methyl group (—CH$_3$) and the carbonyl group (C═O);

(3) the structural unit that contains one or more ethylene unsaturated bonds and is originated from the compound containing the carboxy group (—COOH) and the trifluoromethyl group (—CF$_3$), and the structural unit that contains one or more ethylene unsaturated bonds and is originated from the compound containing the methyl group (—CH$_3$) and the carbonyl group (C═O);

(4) the structural unit that contains one or more ethylene unsaturated bonds and is originated from the compound containing the carboxy group (—COOH) and the methyl group (—CH$_3$), the structural unit that contains one or more ethylene unsaturated bonds and is originated from the compound containing the methyl group (—CH$_3$) and the carbonyl group (C—O), and the structural unit that contains one or more ethylene unsaturated bonds and is originated from the compound containing the phenylene group (—C$_6$H$_4$—); and (5) the structural unit that contains one or more ethylene unsaturated bonds and is originated from the compound containing the carboxy group (—COOH) and the methyl group (—CH$_3$), and the structural unit that contains one or more ethylene unsaturated bonds and is originated from the compound containing an ether group (—O—).

6. The polymer material according to claim 1, comprising:
   a first structural unit that contains only one ethylene unsaturated bond and is originated from a compound containing one or more functional groups reactive to a gas; and
   a second structural unit that is originated from a compound containing a plurality of independent ethylene unsaturated bonds.

7. The polymer material according to claim 6, wherein the polymer material contains 0.2 mol to 10 mol of the second structural unit with respect to 1 mol of the first structural unit.

8. A sensor element comprising a quartz plate, an electrode made of a metal film provided on the quartz plate, and a sensing film provided on the electrode, wherein
   the sensing film contains the polymer material according to claim 1.

9. A gas measurement device comprising the sensor element according to claim 8.

* * * * *